United States Patent [19]
Kumada et al.

[11] Patent Number: 4,605,853
[45] Date of Patent: Aug. 12, 1986

[54] DETECTION DEVICE

[75] Inventors: Shoji Kumada; Hideyuki Asai, both of Iruma, Japan

[73] Assignee: Kabushiki Kaisha Yaskawa Denki Seisakusho, Kitakyushu, Japan

[21] Appl. No.: 655,373

[22] Filed: Sep. 27, 1984

[30] Foreign Application Priority Data

Nov. 9, 1983 [JP] Japan .......................... 58-173359[U]

[51] Int. Cl.⁴ ............................................. G01D 5/36
[52] U.S. Cl. .............................. 250/231 SE; 277/186
[58] Field of Search ................ 250/231 SE, 237 G; 356/395; 340/347 P; 277/9, 11, 186, 181, 188 R, 189

[56] References Cited

U.S. PATENT DOCUMENTS 4,326,128  4/1982  Klein .............................. 250/237 G
4,386,270  5/1983  Ezekiel .......................... 250/231 SE Primary Examiner—David C. Nelms
Assistant Examiner—James G. Gatto
Attorney, Agent, or Firm—Ladas & Parry

[57] ABSTRACT

A supporting mechanism for a fixed detection section in a detection device comprises the fixed detection section and a rotary detection section. The mechanism comprises a plate spring and a supporting plate. The plate spring is mounted on a fixed housing of a drive motor in spaced relation thereto, and has at least in part an elastic portion whose resilient force direction along an axial direction of the rotary shaft. The supporting plate of a ring shape has a plurality of elongated apertures formed therein along a concentric line, and is mounted on the plate spring in spaced relation thereto. The fixed detection section is fixedly connected with screws through the elongated apertures to the supporting plate.

2 Claims, 7 Drawing Figures

FIG. 1
PRIOR ART
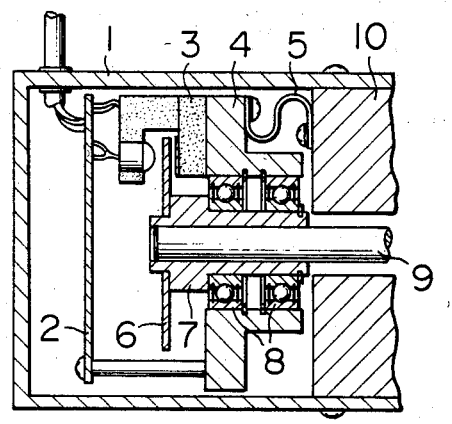
FIG. 2
PRIOR ART
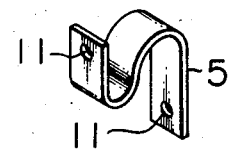
FIG. 3
PRIOR ART
FIG. 4
PRIOR ART
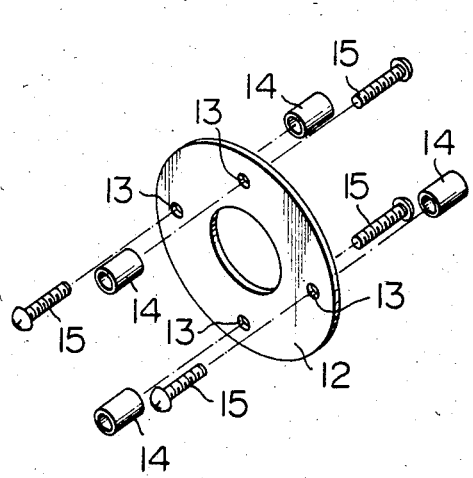
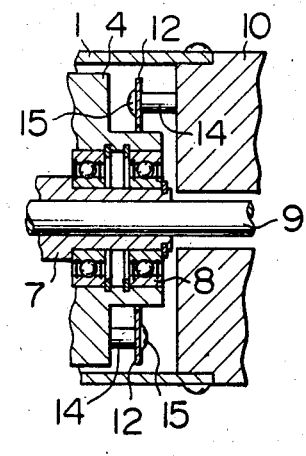

DETECTION DEVICE

BACKGROUND OF THE INVENTION

1. Field of the Technique

The present invention relates to a supporting mechanism for a fixed detection section in a detection device, which comprises a rotary detection section attached to a hollow shaft fixedly connected through its hollow to one end portion of a rotary shaft of a drive motor the load of which is coupled to the other end portion opposite to the one end portion, and the fixed detection section supported by a fixed housing at a side opposite to the load of the drive motor and mounted through a bearing on the hollow shaft.

2. Prior Art

Conventionally, a detection device such as an optical encoder as a detector for a drive motor is mounted on one end portion of a rotary shaft of the drive motor the load of which is coupled to the other end portion opposite to the one end portion. The optical encoder has been coupled heretofore to the rotary shaft by means of an indirect coupling or a direct coupling, the former using, for example, gears and the latter coupling the shaft of the encoder to the shaft of the drive motor with a coupling.

The indirect coupling with gears or the like, however, has been found not satisfactory in that there is a transmission error due to the backlash of the gears and the mechanical parts used for the coupling occupy a large space in the device.

In the direct method using a coupling, although there occurs no transmission error, the structure of the device becomes longer in the axial direction, and the adjustment for alignment of the axes has been cumbersome.

Thus, in this field of technology, a method has been adopted in which the shaft of an optical encoder is made hollow and the encoder is directly coupled through its hollow to and about the rotary shaft of a drive motor.

More in particular, a fixed detection section in a detection device is constructed such that two bearings mounted on a hollow shaft fixedly connected to the rotary shaft of a drive motor support the fixed detection section. The fixed detection section must meet the following two requirements.

(1) Regardless of whether the drive motor is under rotation or not, the fixed detection section must not displace in an axial direction of the rotary shaft.

(2) In the case that the fixedly connected hollow shaft displaces by the same amount of displacement of the rotary shaft of the drive motor, an overload must not be applied to the bearings because the possible displacement of the fixed detection section might occur.

Upon consideration of these points, the present inventor has proposed a means for supporting a fixed detection section at a side of a fixed housing of a drive motor with the help of a plate spring, as shown in FIG. 1.

In the figure, reference numeral 1 designates a frame, 2 designates a printed circuit board for a detector device, 3 designates a sensor for use in the detector device, such as a photodiode, 4 designates a fixed detection section, 5 designates a plate spring, 6 designates a rotary disk, 7 designates a hollow shaft, 8 designates a bearing, 9 designates the rotary shaft of a drive motor, and 10 designates a fixed housing. FIG. 2 shows a perspective view of the plate spring 5, wherein opposite end portions of the plate spring 5 are formed with apertures 11 for use in coupling the fixed detection section 4 to the fixed housing 10 with screws. Thus, the fixed detection section 4 is supported through bearings 8 by the hollow shaft 7 and is also held through the plate spring 5 at the fixed housing 10.

With this plate spring 5, however, only a localized fixation at a point on a circumference on the fixed detection section 4 can be obtained. Therefore, there is a problem that a force is locally applied to the bearings 8 on the hollow shaft 7 as the displacements of the shafts occur.

In order to eliminate this disadvantage, another spring plate method may be thought of in which as shown in FIG. 3, a thin circular plate is used for the spring plate so as to make applied forces uniform throughout the circumference. The thin circular plate is generally a circular plate made of metal spring material having its thickness in the order of 0.05 to 0.3 mm. In the figure, 14 designates a hollow spacer, 15 designates a screw, and 13 designates an aperture formed in the thin circular plate spring 12 through which the hollow spacer 13 is to be inserted. FIG. 4 is a side elevational section in which the plate spring 12 of FIG. 3 is installed to the detection device. It is seen from FIG. 4 that the plate spring 12 is coupled, by threading the screws 15, to the fixed housing 10 of a drive motor and the fixed detection section 4, being spaced therefrom by the distance equal to the length of the spacer 14.

For the output signals from an optical encoder, it is frequently required to make the phases coincide with each other between the pulse generation position of the encoder and the certain position of the rotary shaft. In this case, the encoder is of the type that a particular position on the circumference can be identified, such as an origin point type encoder, an absolute type encoder, or the like. And the certain position of the rotary shaft of a drive motor corresponds to, for example, a key groove, or a particular magnet for a rotary magnetic field type alternating current servo motor. Here, two methods can be applied:

(1) adjusting when the hollow shaft of the encoder is coupled to the rotary shaft of the drive motor, or (2) adjusting when the fixed detection section at the fixed side of the encoder is coupled to the fixed housing of the drive motor.

With the method (1), it is impossible to adjust while the drive motor is rotating. Therefore, it takes a long time to adjust, and it is difficult to adjust the phases with good precision. In general, the method (2) has been employed. However, with the above mentioned thin circular plate spring, it is impossible to adjust since the relative coupling position between the fixed detection section and the fixed housing is determined by the positions of the apertures formed in the circular plate spring.

Here, a further method may be thought of which enables the adjustment by changing opposing two apertures 13 of the circular plate spring 12 of FIG. 3 into elongated apertures which extend along the circumference. However, in this case also, there are problems that the distance along the circumference between the positions of the screws 15 at the fixed housing side and at the fixed detection section side become unequal, and that the elasticity characteristic varies with the relative coupling position.

SUMMARY OF THE INVENTION

It is therefore an object of the present invention to provide a detection device which overcomes the prior art disadvantages; in which a plate spring of a ring shape is mounted on a fixed housing of a drive motor in spaced relation thereto, the plate spring having at least in part an elastic portion whose resilient force directing along an axial direction of a rotary shaft of the drive motor under the mounting condition of the plate spring to the fixed housing; in which a supporting plate of a ring shape having a plurality of elongated apertures formed therein along a concentric line relative to the center of the plate is mounted on the plate spring in spaced relation thereto; and wherein the fixed detection section is fixedly connected with screws through the elongated apertures to the supporting plate, the screws being movable freely for adjustment along the concentric line relative to the center of the plate within the apertures.

The foregoing and other objects are effected by the invention as will be apparent from the following description and claims taken in connection with the accompanying drawings, forming a part of this application.

BRIEF DESCRIPTION OF THE DRAWINGS

FIGS. 1 and 3 show side elevational sections according to the prior art detection devices;

FIGS. 2 and 4 show perspective views of the spring plates of the devices shown in FIGS. 1 and 3;

DETAILED DESCRIPTION OF THE PREFERRED EMBODIMENT

Figure 5:
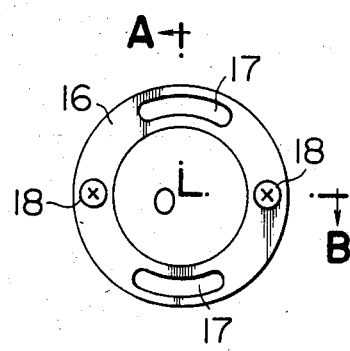
FIGS. 5 and 6 are respectively front and side elevational views partially in section of a supporting plate and a plate spring according to one embodiment of the present invention.
Figure 6:
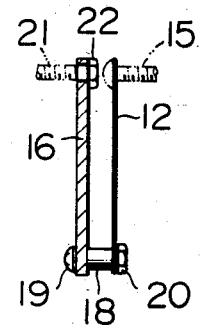
Figure 7:
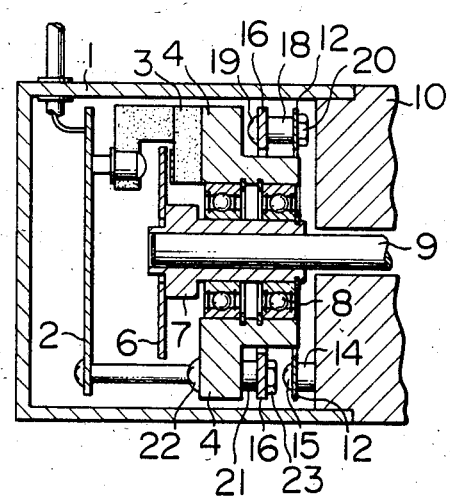
FIG. 7 is a side elevational section of the whole device to which the supporting plate and the plate spring are installed.

FIG. 5 is a front view of a supporting plate, FIG. 6 is a side elevational section along the line AOB in FIG. 6, and FIG. 7 is a side elevational section of the detection device to which the supporting plate and a plate spring are installed.

The spring plate 12 has the same configuration shown in FIG. 3 with which a supporting plate 16 is threaded and engaged by using screws 19 and nuts 20 through hollow spacers 18. The spring plate 12 generally of a ring shape is mounted on the fixed housing 10 in spaced relation thereto. The plate spring 12 has at least in part an elastic portion whose resilient force directing along an axial direction of the rotary shaft 9 under the mounting condition of the plate spring 12 to the fixed housing 10. The supporting plate 16 generally of a ring shape has a plurality of elongated apertures 17 formed therein along a concentric line relative to the center of the plate. The supporting plate 16 is thicker than the plate spring 12 which is made of aluminum plate, iron plate or the like having a thickness of about 0.7 to 3 mm. The supporting plate 16 has also a higher rigidity along an axial direction of the rotary shaft 9 under the mounting condition of the plate spring to the fixed housing 10. The supporting plate 16 is mounted on the plate spring 12 in spaced relation thereto. The fixed detection section 4 is fixedly connected with screws 22 and nuts 23 through hollow spacers 21 and the elongated apertures 17 to the supporting plate 16. The screws 22 may be moved freely for adjustment along the concentric line relative to the center of the plate 16 within the apertures 17.

As seen from the above description, by virtue of the provision of the thick supporting plate 16 with the elongated apertures 17, it is possible to rotate the fixed detection section 4 of the encoder or detection device along the circumference of the rotary shaft 9 in order to compensate for the rotary displacement thereof. Thus, it is possible to adjust the phases with ease and with an excellent precision. Further, the elasticity characteristic has always a constant value irrespective of the relative coupling position after phase adjustment.

According to the present invention, the hollow shaft direct coupling to the rotary shaft of a drive motor can solve the problem of the longer dimension in an axial direction in the case using a coupling for attaching an encoder. The coupling to the fixed housing of a drive motor is performed by using a thin circular plate spring so that applied forces to the bearings of an encoder resulting from the axial displacement can be made uniform. In addition, the elongated apertures are provided on the supporting plate in order to meet the requirement for the phase adjustment between the drive motor and the encoder, and the supporting plate is additionally connected to the spring plate. Therefore, an elasticity characteristic is maintained constant. Further, it is possible to obtain a coupling mechanism for a detection device or encoder with a hollow shaft which is compact and simple in construction.

While there has been described what is at present considered to be the preferred embodiment of the present invention, it will be understood that various modifications may be made therein, and it is intended to cover in the appended claim all such modifications as fall within the true spirit and scope of the invention.

What is claimed is:

1. In a detection device comprising a rotary detection section attached to a hollow shaft fixedly connected through its hollow to one end portion of a rotary shaft of a drive motor the load of which is coupled to the other end portion opposite to said one end portion, and a fixed detection section supported by a fixed housing at a side opposite to said load of said drive motor and mounted through a bearing on said hollow shaft; the detection device in which a plate spring generally of a ring shape is mounted on said fixed housing in spaced relation thereto, said plate spring having at least in part an elastic portion whose resilient force is directed along an axial direction of said rotary shaft under said mounting condition of said plate spring to said fixed housing; and a supporting plate generally of a ring shape having a plurality of elongated apertures formed therein along an concentric line relative to the center of said plate mounted on said plate spring in spaced relation thereto; and wherein said fixed detection section is fixedly connected with screws through said elongated apertures to said supporting plate, said screws being movable freely for adjustment along said concentric line relative to the center of said plate within said apertures.

2. A detection device according to claim 1, in which said supporting plate has a higher rigidity along an axial direction of said rotary shaft than those along other directions.

* * * * *